May 5, 1931.   R. M. ABERNATHY   1,803,825
MILK CAN COVER
Filed Dec. 14, 1929
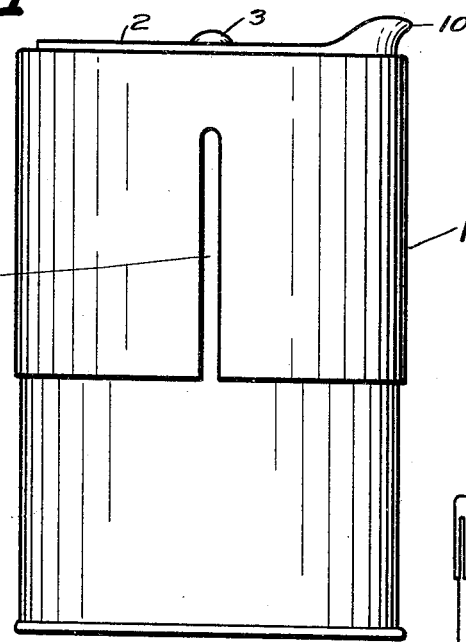
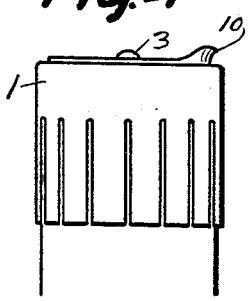
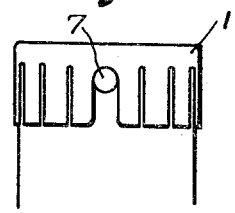
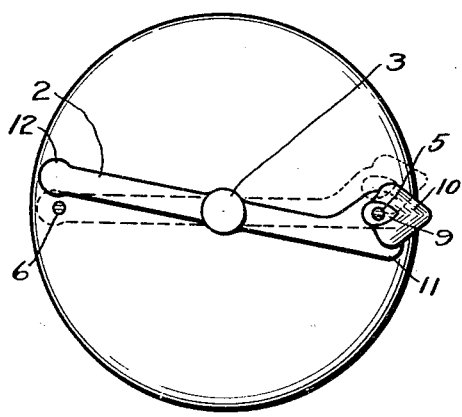
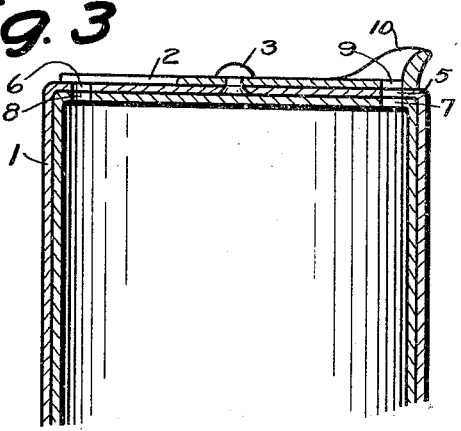
INVENTOR
Rollin M. Abernathy
BY
*Harry Bowen*
ATTORNEY Patented May 5, 1931

1,803,825

UNITED STATES PATENT OFFICE

ROLLIN M. ABERNATHY, OF SEATTLE, WASHINGTON

MILK CAN COVER

Application filed December 14, 1929. Serial No. 413,995.

The invention is a cover for milk cans or the like, that may be placed over the top of the can to cover openings in the top of the can, and which is provided with a means whereby the openings may be opened and closed.

The object of the invention is to provide a cover for milk cans or the like, that may readily be placed over the end of the can. Another object of the invention is to provide a cover for milk cans or the like, that has openings in it to correspond with openings in the top of the can.

And a further object of the invention is to provide a cover for milk cans or the like, with a bar having a spout on one end pivotally attached to its top, so that when it is in one position it will close openings in the cover and when it is moved to one side the spout will be over one of the openings and the other opening will be open.

With these ends in view the invention embodies a thin, cylindrical shaped casing having one end open, a slit in its side, and two holes in the closed end, and a bar pivotally attached to the outside of the closed end, with a spout on one end.

Other features and advantages of the invention will appear from the following description taken in connection with the drawings, wherein:—

Figure 1 is a side elevation.
Figure 2 is a plan view.
Figure 3 is a cross section, through the upper end.
Figure 4 is a view similar to that shown in Figure 1 showing a plurality of slits instead of one.
Figure 5 is a view showing an alternate design in which the opening is formed in the side of the can.

In the drawings I have shown my cover as it would be constructed, wherein numeral 1 indicates the casing numeral 2 the bar, and numeral 3 the rivet upon which the bar is pivoted.

The casing 1 may be constructed as shown in Figure 1 with a slit 4 in its side or as shown in Figure 4 with a plurality of slits which make it possible to spread the lower end when it is placed on a can, and in the upper end are holes 5 and 6, which may be placed over holes 7 and 8 in the top of the can. The bar 2 is pivotally mounted on the pin 3 in the center of the top of the cover, and has an opening 9 at one end which, when in the open position, will be directly over the openings 5 and 7 in the cover and can. A spout 10 is placed around the openings 9 at the end of the bar 2, which extends upward and outward to guide the flow of material, and at each end of the bar are projections 11 and 12, by which the holes in the cover and can may be closed by moving the bar to the position shown in dotted lines in Figure 2, when the can is not in use. It will be seen that the cover may be readily removed, cleaned, replaced or used on another can as often as may be desired.

In the design shown in Figure 5 the opening 7 is made in the side instead of the top of the can, and in this design it is only necessary to turn the cover to open or close.

It will be understood that changes may be made in the construction without departing from the spirit of the invention. One of which changes may be in the design of the cover, as it is understood that this may be made longer or shorter than shown, and may have as many openings as may be desired in the sides and top, another may be in the design of the bar 2, as it is understood that this may be of any suitable shape, and may be made with or without the spout as may be desired, and still another may be in the means for attaching the bar to the cover.

Having thus fully described the invention, what I claim to be new and desire to obtain by Letters Patent, is:—

A cover for milk cans or the like embodying a cylindrical shaped casing with one end closed, the other open, slits in the side adjacent the open end, and openings in the closed end, and a bar pivotally attached to the center of the closed end, with means at the ends for closing the openings, and a spout at the side of one end of said bar adapted to be placed over one of the openings.

In testimony whereof I affix my signature.

ROLLIN M. ABERNATHY.